United States Patent [19]

Jackson et al.

[11] 4,384,187

[45] May 17, 1983

[54] FEEDBACK CONTROL SYSTEM FOR PULSED DC ARC WELDING

[75] Inventors: Dale E. Jackson, Clay; William E. Wright, Jr., East Syracuse, both of N.Y.

[73] Assignee: Carrier Corporation, Syracuse, N.Y.

[21] Appl. No.: 252,534

[22] Filed: Apr. 9, 1981

[51] Int. Cl.³ .............................................. B23K 9/09
[52] U.S. Cl. ......................... 219/130.51; 219/130.21; 219/130.31
[58] Field of Search .......... 219/137 PS, 130.5, 130.51, 219/130.21, 130.31, 69 G

[56] References Cited

U.S. PATENT DOCUMENTS

| | | |
|---|---|---|
| 3,522,412 | 8/1970 | Bell et al. . |
| 3,598,954 | 8/1971 | Iceland et al. . |
| 3,614,378 | 10/1971 | Goodell et al. . |
| 3,818,177 | 6/1974 | Needham et al. . |
| 3,826,890 | 7/1974 | Bartlett . |
| 3,838,244 | 9/1974 | Petrides et al. . |
| 3,894,210 | 7/1975 | Smith et al. . |
| 3,927,293 | 12/1975 | Bell, Jr. ............................ 219/69 G |
| 3,989,922 | 11/1976 | Fahey . |
| 3,995,138 | 11/1976 | Kalev et al. . |
| 4,016,484 | 4/1977 | Crouthamel . |
| 4,092,517 | 5/1978 | Woodacre . |
| 4,123,646 | 10/1978 | Keinanen . |
| 4,201,906 | 5/1980 | Puschner ....................... 219/137 PS |
| 4,301,355 | 11/1981 | Kimbrough et al. .......... 219/130.31 |

FOREIGN PATENT DOCUMENTS 1586375 3/1981 United Kingdom .
620344 7/1978 U.S.S.R. ......................... 219/130.51

OTHER PUBLICATIONS

F. Rienks et al., "Development and Evaluation of a Modulated Power Control for Fusion Welding," *Welding Research Supplement*, 5/1971, pp. 222s–230s.
A Look at the Brazing of Aluminum–Particularly Fluxless Brazing by O. R. Singleton in Welding Journal of Nov. 1970, pp. 843 through 849.
Safe and Sure Aluminum Brazing by H. K. Kerr and L. E. Pennington in Machine Design of Nov. 14, 1974, pp. 171 through 175.
The Future of Copper and Aluminum in Fluxless Vacuum Brazing of Aluminum by Harry K. Herr in Metal Progress of Dec. 1969, pp. 68 through 73.

*Primary Examiner*—C. C. Shaw
*Attorney, Agent, or Firm*—Donald F. Daley; David L. Adour

[57] ABSTRACT

A feedback control system for a pulsed direct current (DC) arc welding system is disclosed wherein the duty cycle of current pulses supplied by a power supply is controlled in response to resistance sensed at the arc gap of the system. The circuit comprises a voltage sensor, a high-low regulator, and a pulse width signal generator. The voltage sensor senses the voltage drop across the arc gap. This voltage is directly proportional to the resistance at the arc gap. The high-low regulator responds to the sensed voltage to generate an output signal when the voltage drop across the arc gap exceeds a high limit or is below a low limit. This output signal alters the control signal from the pulse width signal generator which controls the arc welding system power supply. The control signal from the generator is altered so that the duty cycle of the current pulses is adjusted, in response to changes in the resistance sensed at the arc gap, to maintain a constant time averaged power flow to the work pieces at the arc gap. The form of the current pulses, including peak current level, is unchanged except for the duty cycle adjustment.

6 Claims, 7 Drawing Figures

FEEDBACK CONTROL SYSTEM FOR PULSED DC ARC WELDING

BACKGROUND OF THE INVENTION

This invention relates to an electrical control system for an arc welding system and more particularly to a feedback control circuit for a pulsed direct current (DC) arc welding system. Specifically, this invention relates to a feedback control circuit for controlling power flow to work pieces at an arc gap by modulating the pulse width of current pulses supplied from a pulsed DC arc welding power supply to the arc gap. The current pulses are preferably modulated in response to resistance sensed at the arc gap.

There are many situations in which it is desirable to arc weld together two pieces of metal. For example, a heat exchanger for an air conditioning system may be made from sections of thin wall aluminum tubing which are joined to provide a continuous circuit for the flow of a refrigerant. The sections must be joined so that there are no leaks. One method for accomplishing this is by arc welding.

One problem encountered in arc welding is the presence of foreign materials on the surfaces of the work pieces which are being welded together. These foreign materials can degrade the quality of the weld if they are not removed. Metals such as aluminum, magnesium, and beryllium copper, pose an especially difficult surface contaminant problem since oxides instantaneously form on the surfaces of these metals when they are exposed to air. Oxides may be removed by using a nonmetal chlorine or fluorine base flux during the welding process but this flux is corrosive and is not compatible with the environment. Therefore, it is desirable to arc weld, especially to arc weld metals such as aluminum, magnesium, and beryllium copper without using a flux.

Fluxless welding is possible by using certain alternating current (AC) arc welding techniques. U.S. Pat Nos. 3,894,210 to Smith, et at. and 3,818,177 to Needham, et al. disclose such AC arc welding techniques. These techniques are especially useful for welding certain materials, such as aluminum, magnesium, and beryllium copper, since a weld can be made even if oxides are present on the surfaces of the work pieces. However, there are many situations when it is desirable to use direct current (DC) arc welding. For example, it is difficult to weld thin wall sections of aluminum tubing used in making heat exchangers for air conditioning systems by using an AC arc welding technique. This is because AC arc welding requires a significant power flow to the work pieces to make a weld and dissipate oxides without using a flux. This power flow heats the work pieces to an undesirable temperature because the thin wall tubing does not provide a sufficient heat sink for conducting away heat energy. Thus, significant sagging in the weld area can occur and there is a possibility that the work pieces will be burned through. This distortion of the weld area can be reduced if DC arc welding is used. Also, electrode life can be increased if DC arc welding is used rather than AC arc welding. Furthermore, power flow to the work pieces may be more precisely controlled when using DC arc welding. These are just some of the advantages inherent in DC arc welding when welding certain materials such as the thin wall sections of aluminum tubing used in making heat exchangers for air conditioning systems. Therefore, it is preferable to weld these materials by using DC arc welding rather than by using other techniques such as fluxless AC arc welding.

One disadvantage of conventional DC arc welding is that this type of arc welding is not generally capable of fluxless welding of certain materials, such as aluminum, magnesium, and beryllium copper, which form difficult to reduce oxides on their surfaces. However, there is a novel method of pulsed DC arc welding for welding these materials without using a flux. This novel method is desclosed in copending U.S. patent application Ser. No. 252,567, filed Apr. 9, 1981, in the name of Moyer et al., entitled "Pulsed DC Arc Welding". This copending application is assigned to the same assignee as the present application.

According to this novel method, special pulses of positive direct current are applied at an arc gap to arc weld work pieces at the arc gap. The special pulses have a form which is similar to conventional DC pulses except that the ratio of the magnitude of the peak current to the magnitude of the maintenance current at the leading edge of each current pulse is selected to have a special feature. Essentially, this ratio is maximized and the increase from the maintenance current level to the peak current value is adjusted to occur in a time interval whereby a thermal shock effect is created. A related kind of thermal shock effect is well known in the field of vacuum brazing as part of a multi-step heat treatment process in which materials are joined together by brazing. Basically, this thermal shock effect results from rapidly heating work pieces having surface oxides with a coefficient of thermal expansion which is substantially less than the coefficient of thermal expansion of the underlying pure material. The rapid heating causes an uneven rate of expansion which fractures and splits apart the oxides on the surfaces of the work pieces.

The split apart oxides are pushed away from the weld area due to the melting and joining of the underlying pure materials during the novel arc welding process disclosed above. Other physical phenomena also may be responsible for the exemplary welds formed when using this novel arc welding method but the thermal shock effect is believed to be the primary mechanism by which the oxides are dissipated. Regardless of the exact physical phenomena underlying the oxide dissipation, the feature of maximizing the ratio of peak current to maintenance current at the leading edge of each current pulse is an essential element of this novel method of DC arc welding. This feature is best explained when it is assumed that the thermal shock effect is the primary mechanism by which the oxides are dissipated.

The optimal values for the maintenance current, peak current and time duration in which the increase from the maintenance current level to peak current value occurs, when arc welding according to the novel arc welding method described above, are selected through a trial and error process. These optimal values depend on the kind of material being welded, the thickness of the work pieces being welded, and other such factors.

Also, power flow from the welding electrode to the work pieces is an important factor in determining weld quality. Good quality welds cannot always be made because of changes in this power flow as a function of time. It is especially difficult to continually make good quality welds on certain materials, such as thin wall aluminum tubing, when mass producing products, such as heat exchangers for air conditioning systems, because of this variation in power flow. This problem is present even if the novel method of fluxless pulsed DC arc welding described above is used in the manufacturing process.

These changes in power flow usually are caused by variations in the resistance between the welding electrode and the work pieces due to inhomogeneities in the ionized gas, variations in work piece dimensions resulting in a changing arc gap separation, naturally occurring fluctuations in power supply output voltage and other such phenomena. This variation in resistance between the welding electrode and the work pieces directly affects the amount of power which reaches the work pieces from the welding electrode. It is desirable to maintain this power flow at a constant optimal value since it is this power flow which primarily determines weld quality.

Conventional arc welding systems of the pulsed DC type do not specifically address the problem of controlling power flow to the work pieces. Typically, these systems regulate current flow by adjusting the voltage applied across the arc gap in response to variations in arc gap resistance to maintain the current flow at constant preset levels. Therefore, the normal operation of a current regulated pulsed DC system results in variations in the power flow to the work pieces.

A method of controlling this power flow, when using a pulsed DC power supply, is by changing the pulse width of the current pulses supplied to the arc gap. If a periodic series of current pulses is being used this amounts to changing the duty cycle of the current pulses. Thus, this method can be called pulse width modulation or duty cycle modulation. This method of controlling power flow is especially useful when the form of the DC pulses must be maintained as required when arc welding according to the novel pulsed DC arc welding method described above. Therefore, it is desirable to provide a control system for an arc welding system pulsed DC power supply which is capable of precisely adjusting power flow to work pieces by modulating the pulse width of current pulses supplied by the power supply to the work pieces. Preferably, this pulse width modulation is done without otherwise altering the general form of the current pulses. Furthermore, it is desirable to provide a control system for an arc welding system pulsed DC power supply which is capable of adjusting power flow by pulse width modulation to compensate for variations in resistance between the welding electrode and the work pieces.

SUMMARY OF THE INVENTION

Therefore, it is an object of the present invention to provide a control system for a pulsed DC arc welding system for controlling the pulse width of current pulses supplied from a power supply of the arc welding system to the arc gap.

It is another object of the present invention to provide a feedback control circuit for controlling a power supply of a pulsed DC arc welding system. The power supply is controlled to modulate the pulse width of current pulses supplied to the arc gap from the power supply. The current pulses are modulated in response to changes in the voltage measured across the arc gap as a function of time.

It is a further object of the present invention to provide a feedback control circuit for controlling a power supply of a pulsed DC arc welding system to provide DC pulses which are modulated in pulse width in response to changes in the voltage measured across the arc gap to provide a constant time-averaged power flow to the work pieces at the arc gap. This constant time-averaged power flow is maintained even if there are variations in the resistance between the welding electrode and the work pieces caused by changes in the separation distance between the electrode and the work pieces or by other such phenomena.

These and other objects of the present invention are accomplished by a feedback control circuit comprising a voltage sensor, high-low regulator, and pulse width control signal generator. The feedback control circuit controls a pulsed DC arc welding power supply. The voltage sensor detects the voltage drop across the arc gap as a function of time. This voltage is directly proportional to the resistance across the arc gap. Thus, the voltage sensor directly indicates variations in parameters affecting power flow to work pieces at the arc gap such as a change in the separation distance between the welding electrode and the work pieces. The detected voltage is inputted to the high-low regulator which processes this voltage signal to determine whether the voltage has increased above a selected high limit or has decreased below a selected low limit. If either of these conditions has occurred, the high-low regulator generates an output signal which is supplied to the pulse width signal generator.

The pulse width signal generator continuously provides a voltage control signal to the pulsed DC arc welding power supply which controls the duty cycle of the current pulses supplied by the power supply to the arc gap. An operator initially selects a particular duty cycle for the current pulses which gives optimal weld characteristics. This optimal duty cyle varies depending on the kind of material being welded, the thickness of the work pieces and other such factors. This optimal duty cycle is selected through a trial and error process. The high-low regulator provides a supplemental voltage signal to the pulse width signal generator which alters the control signal from the generator. The generator control signal is altered to decrease or increase the duty cycle of the current pulses supplied by the DC power supply to the arc gap in response to changes in the supplemental voltage signal. Thus the duty cycle of the current pulses is changed in response to changes in the voltage drop across the arc gap. This change in the duty cycle maintains the time-averaged power flow to the work pieces at the arc gap at the power flow level associated with the optimal duty cycle initially selected. None of the other characteristics of the current pulses, such as frequency and peak current, are affected. Thus, the power flow is automatically maintained at the optimal level without changing the overall form of the current pulses. Therefore, this optimal power flow is maintained even if there are changes in parameters which affect power flow to the work pieces such as a change in the separation distance between the welding electrode and the work pieces.

DESCRIPTION OF THE PREFERRED EMBODIMENT

Figure 1:
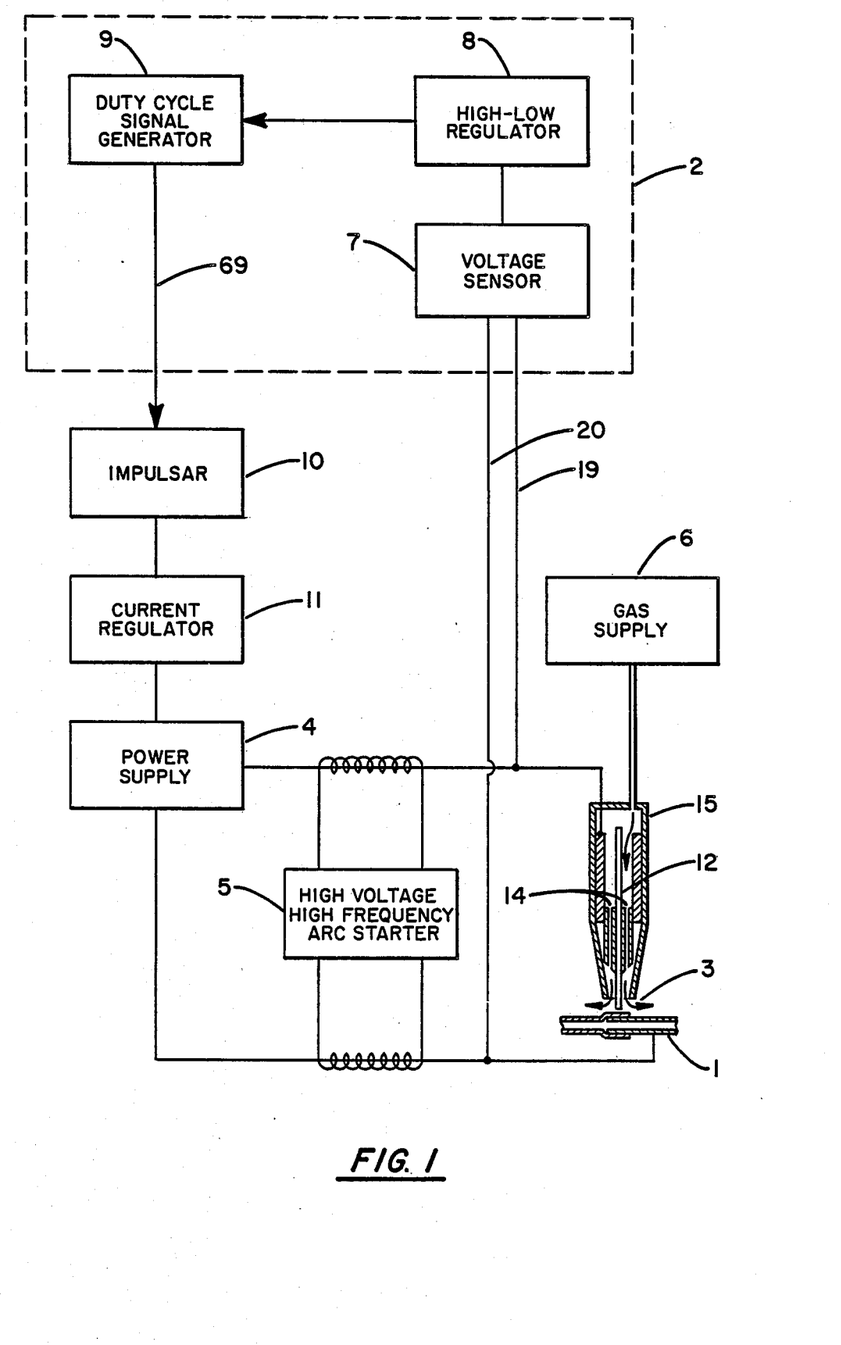
FIG. 1 shows a block diagram of an arc welding system including a feedback control circuit 2 for adjusting the pulse width of current pulses supplied by a power supply to an arc gap.

Referring not to FIG. 1, a block diagram of an arc welding system is shown including a feedback control circuit 2 for modulating the pulse width of direct current (DC) pulses applied at an arc gap 3. The pulses are modulated in pulse width while maintaining their peak magnitude constant to provide a constant time-averaged power flow across the arc gap 3. Current flow across the arc gap 3 from the electrode 12 to the work pieces 1 is determined by the operation of power supply 4. The power supply 4 can be one of a variety of power supplies which are available commercially. If the novel method of pulsed DC arc welding described previously is to be used it may be necessary to have a power supply 4 with a relatively high peak current capability, depending on the type of work pieces being welded, to provide the required ratio of peak current value to maintenance current level at the leading edge of each current pulse as required by this novel method. Conventional power supplies may be modified by those of ordinary skill in the art to provide a power supply with such a high peak current capability. Also, such a power supply is available from Creative Pathways, Inc., 2917 Lomita Blvd., Torrance, CA 90505.

Impulsar 10 in connection with current regulator 11 controls the operation of the power supply 4. This is a conventional type of control for a power supply 4. Also, a high voltage, high frequency arc starter 5 controls the initial flow of current across the arc gap 3. This too is a conventional feature of arc welding systems. The arc starter 5 provides a high voltage to initiate current flow across the arc gap 3 by ionizing inert gas supplied to the arc gap 3 from the gas supply means 6 through passageways 14 in the electrode holder 15. After the initiation of current flow the arc starter 5 discontinues operation. Subsequently, the inert gas is ionized by the operation of the power supply 4 to sustain current flow across the arc gap 3 throughout the arc welding process. The continuous supply of inert gas prevents impurities from reaching the weld and prevents formation of surface films, such as oxides, on the work pieces 1 during the arc welding process. However, it is not necessary to supply inert gas during the welding process if other steps are taken, such as providing a vacuum at the arc gap 2, to prevent oxide formation and impurities from reaching the weld.

The electrode holder 15 can be one of a variety of constructions. For example, the holder 15 can be a moving head type wherein the work pieces 1 and the holder 15 are rotated relative to each other to effect welding at selected positions on the work pieces 1. The holder 15 can be operated to made a continuous weld on the work pieces 1 or a series of spot welds.

A voltage sensor 7 senses the voltage drop across the arc gap 3 through the electrical leads 19 and 20. This voltage is directly portional to the resistance across the arc gap 3. The voltage sensor 7 supplies an electrical signal which indicates the resistance sensed at the arc gap 3 to a high-low regulator 8. The high-low regulator 8 provides duty cycle signal generator 9 with a control signal indicating whether the pulse width of the current pulses needs to be increased or decreased to maintain a constant time-averaged power flow to the work pieces 1 at the arc gap 3. The high-low regulator 8 is designed so that a control signal is supplied to the duty cycle signal generator 9 only when the voltage sensed at the arc gap 3 by the voltage sensor 7 exceeds a preselected high value or is below a preselected low value. The duty cycle generator 9 supplies a continuous control signal to the impulsar 10 to result in a preselected baseline pulsed DC flow across the arc gap 3. However, when the duty cycle signal generator 9 receives a signal from the high-low regulator 8 it responds to alter the operation of impulsar 10. The duty cycle signal generator 9 supplies a signal to the impulsar 10 to increase the pulse width of the current pulses or decrease the pulse width of the current pulses depending on the control signal received from the high-low regulator 8.

It should be noted that the voltage sensor 7 is not the only type of sensor which may be used to sense power flow related conditions at the arc gap 3. For example, a thin film resistance temperature detector (RTD) may be attached to the work pieces 1 to generate an electrical signal which is a function of the temperature of the work pieces 1. Change in the temperature of the work pieces 1 are a reliable indicator of variations in the power flow to the work pieces 1. The electrical signal of the RTD device can be used to supply the high-low regulator 8 with a voltage signal representing power flow which can be processed by the high-low regulator 8 in the same manner as the electrical signal from the voltage sensor 7 is processed.

Figure 2:
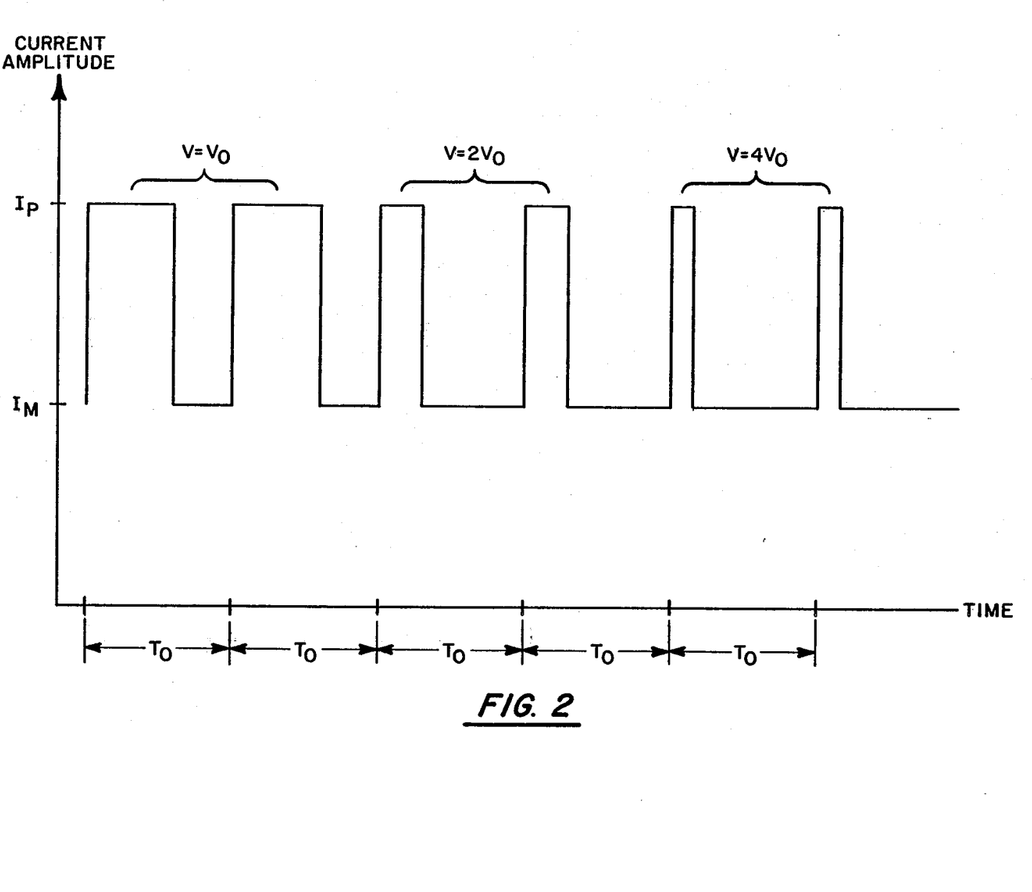
FIG. 2 is a schematic graph of the amplitude of current pulses which are applied to work pieces to maintain the time-averaged power flow to the work pieces constant when the voltage drop sensed at the arc gap is increasing.

Referring now to FIG. 2, a schematic graph is shown of current pulses varying in pulse width as a function of time but having a constant period $T_o$ between pulses. The positive DC pulses are preferably of the special novel type described previously wherein the leading edge of each current pulse is chosen to have a ratio of peak current to maintenance current which is maximized to provide a thermal shock effect to dissipate oxides which may have formed on the surfaces of the work pieces 1. The difference in the thermal co-efficient of expansions of an oxide layer and the underlying pure metal results in the thermal shock effect which dissipates the oxides. The present method of pulse width modulation is especially designed for this type of pulsed DC arc welding.

The main principle of the present invention is the variation in pulse width to maintain power flow to the work pieces 1 constant for varying resistances at the arc gap 3. The constant power flow to the work pieces improves the quality of the weld. Sagging may occur if the weld is made by supplying an excessive amount of power to the work pieces 1. Also, there is a possibility of burning through the work pieces if too much power is supplied to the work pieces 1. If too little power is supplied to the work pieces 1 there may not be sufficient power to fully penetrate the work pieces 1. A weaker and less durable weld results compared to when optimal power flow to the work piece is maintained. The present invention reduces the possibility of poor weld quality by always maintaining optimal power flow to the work pieces.

For purposes of explanation, assume that a constant time-averaged power flow $P_c$ gives the optimal weld for a particular pulsed DC arc welding process. The time-averaged power equation is:

$$P = \int_o^T V(t)I(t)dt,$$

where V(t) is the voltage drop across the arc gap 3 as a function of time, I(t) is the current flow across the arc gap as a function of time, and T is the period of the current pulses. Assume a constant period $T_o$ corresponding to a fixed frequency $F_o$, a constant voltage drop $V_o$, and a periodically varying current flow given by the following function repeating itself during each successive period $T_o$:

$$I(t) = \begin{cases} I_p\ O \leq t \leq X \\ I_m\ X < t \leq T_o \end{cases}$$

where $I_p$ is a constant peak current value, where $I_m$ is a constant maintenance current value, which for purposes of this discussion can be assumed to be zero, and where X is the duty cycle of the current pulses. Assuming that $I_m$ is zero, then integrating and solving the power equation for X gives:

$$X = P_c/(V_o I_p)$$

This is the duty cycle necessary to sustain an optimal power flow $P_c$ to the work pieces 1 at the arc gap 3, while maintaining a peak pulsed current flow of $I_p$, when the voltage drop across the arc gap 3 is a constant $V_o$.

If the voltage drop across the arc gap 3 increases to $2V_o$ then solving for X gives:

$$X = P_c/(2V_o I_p)$$

Thus, the duty cycle must change to one-half the original duty cycle to sustain the optimal power flow $P_c$ to the work pieces 1. If the voltage drop increases to $4V_o$ then $$X = P_c/(4V_o I_p)$$

and the duty cycle must change to one-quarter the original duty cycle to sustain this constant optimal power flow $P_c$.

The above-described variation in duty cycle X is illustrated in FIG. 2 where initially it has been assumed that a 50% duty cycle is required to sustain an optimal power flow $P_c$ to the work pieces 1 at a constant voltage drop $V_o$ across the arc gap 3. A 50% duty cycle corresponds to current flowing across the arc gap 3 for 50% of the operating time. During the other 50% of the operating time only the maintenance current $I_m$ flows across the arc gap 3. The second two pulses shown in FIG. 2 represent the pulses generated when the voltage sensor 7 senses an increased voltage drop at the arc gap 3 equal to $2V_o$. An increased voltage drop indicates an increase in resistance across the arc gap 3 which means that the pulse width must be decreased to sustain the same power flow $P_c$ to the work pieces 1 at the arc gap 3. Thus, as shown by the second two current pulses the duty cycle is decreased to 25%. The third group of two pulses illustrates the variation in pulse width as the voltage drop across the arc gap increases further to $4V_o$ indicating a further increase in resistance across the arc gap 3. The pulse width is decreased to give a 12.5% duty cycle. Thus, although the instantaneous power delivered to the work piece varies the time-averaged power delivered to the work pieces is constant. Also, it should be noted that the peak amplitude of the current pulses is maintained constant at a value $I_p$.

Figure 3:
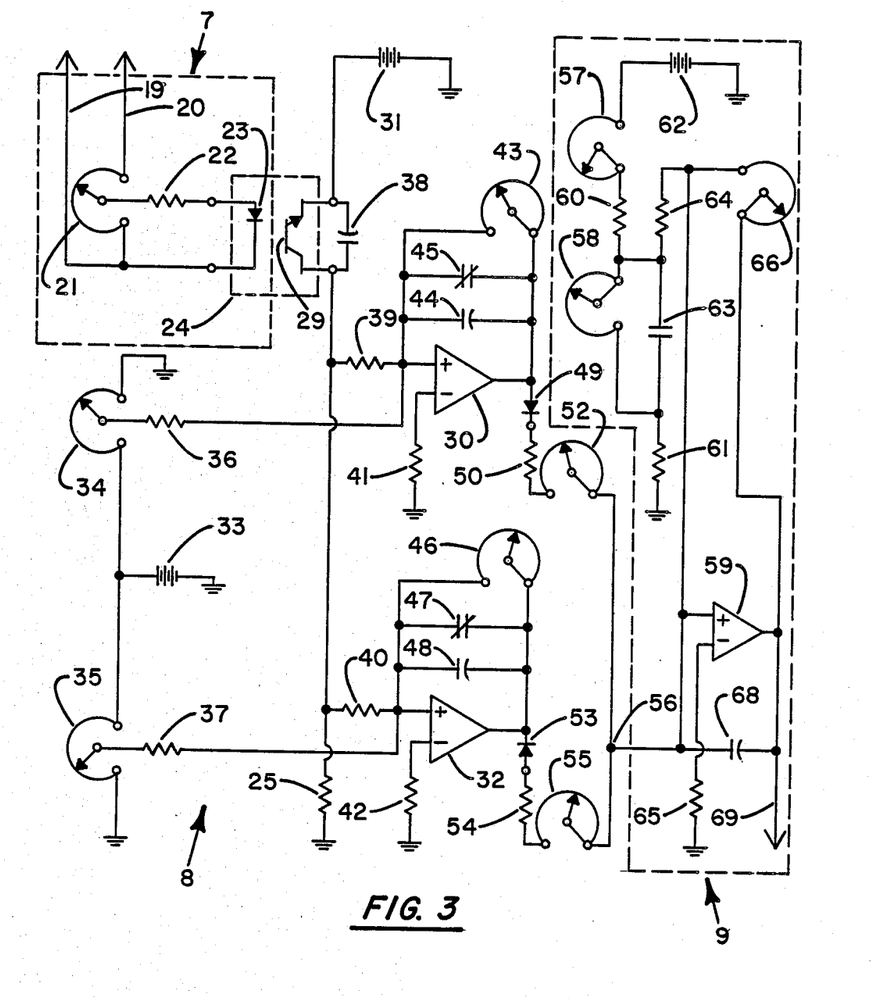
FIG. 3 shows specific circuit components for the feedback control circuit shown in FIG. 1.

FIG. 3 shows specific electrical components for the feedback control circuit 2 comprising voltage sensor 7, high-low regulator 8, and duty cycle signal generator 9 of the arc welding system shown in FIG. 1. The voltage sensor 7 comprises variable resistance device 21, resistor 22, and light emitting diode (LED) 23. Electrical leads 19 and 20 are connected across the arc gap 3 as shown in FIG. 1. The variable resistance device 21 acts as a voltage divider to control the flow of current through resistor 22 and light emitting diode 23.

High-low regulator 8 comprises a variety of components including phototransistor 29, op amp 30, op amp 32 and variable resistance devices 34 and 35. Phototransistor 29 and capacitor 38, which are electrically connected in parallel to voltage supply 31, provide a voltage signal, representing the varying arc voltage which is sensed by the voltage sensor 7 and transferred to the phototransistor 29 from LED 23, to the inverting inputs of the op amps 30, 32. This representative voltage signal is provided to the inverting input of op amp 30 through isolation resistor 39 and to the inverting input of op amp 32 through isolation resistor 40. This representative voltage signal is the input signal which is processed by the high-low regulator 8 to modulate the operation of the duty cycle generator 9. The phototransistor and capacitor 38 are connected to ground through resistor 25. It should be noted that the term "ground," when used in describing the high-low regulator 8 and the duty cycle generator 9, is equivalent to circuit common.

A voltage supply 33 supplies a reference voltage, which is adjusted by variable resistance device 34, to the inverting input of op amp 30. Similarly, variable resistance device 35 adjusts the reference voltage supplied by voltage supply 33 to provide an adjusted reference signal to the inverting input of op amp 32. The signal from the variable resistance device 34 is provided to the op amp 30 through isolation resistor 36 and the signal from the variable resistance device 35 is provided to op amp 32 through isolation resistor 37. These adjusted reference voltage signals are summed with the representative voltage signal from the phototransistor 29 at the inverting inputs of the op amps 30 and 32.

The non-inverting inputs of the op amps 30 and 32 are connected to ground through resistors 41 and 42, respectively. Variable resistance device 43 and capacitor 44 are connected in parallel to op amp 30 to control the gain of the op amp 30. Also, time delay switch 45 is connected in parallel to the op amp 30 to provide a shunting capability across the op amp 30. Similarly for op amp 32, variable resistance device 46, time delay means 47 and capacitor 48 are connected in parallel to the op amp 32 for the same purposes. Diode 49, resistor 50 and variable resistance device 52 are connected in series at the output of op amp 30. Diode 49 blocks the transmission of negative output voltage signals from the op amp 30. Similarly, op amp 32 has diode 53, resistor 54 and variable resistance device 55 connected in series at the output of op amp 32. Diode 53 blocks positive output voltage signals from the op amp 32. It should be noted that the variable resistance devices 52 and 55 control the magnitude of the voltage signals outputted from the op amps 30 and 32, respectively. The voltage signals from the op amps 30 and 32 are summed at point 56 and supplied to the duty cycle signal generator 9 shown in FIG. 1.

The duty cycle signal generator 9 comprises a voltage divider including variable resistance device 57 with resistor 60 and variable resistance device 58 with resistor 61. Also, the generator 9 includes op amp 59. A voltage supply 62 supplies voltage to the variable resistance devices 57 and 58. A time delay switch 63 is connected in parallel to the variable resistance device 58 to provide a means for shunting variable resistance device 58. The output from the voltage divider is supplied through resistor 64 to the inverting input of op amp 59. This voltage signal is summed with the voltage signal from the high-low regulator 9. The non-inverting input of op amp 59 is connected to ground through resistor 65. The gain of op amp 59 is controlled by variable resistance device 66 and capacitor 68. The output from op amp 59 is supplied to impulsar 10, as shown in FIG. 1, through lead 69. The voltage divider insures that a reference signal is always generated by op amp 59 for supply to impulsar 10. If a signal is present at point 56 it is summed with the output from the voltage divider to provide an adjusted input signal to the op amp 59 which adjusts the output signal from op amp 59.

In operation, voltage is sensed at the arc gap 3 through leads 19 and 20 of voltage sensor 7. This voltage signal is adjusted by the variable resistance device 21 and supplied through the resistor 22 to the light emitting diode (LED) 23. The light emitting diode 23 emits light having an intensity which varies in direct proportion to the voltage sensed at the arc gap 3. Thus, a higher sensed voltage causes the LED 23 to emit light of a greater intensity.

The phototransistor 29 detects the intensity of the light from the LED 23. This interaction of the phototransistor 29 and the LED 23 occurs within an area 24 of the feedback control circuit 2, as shown in FIG. 3. The phototransistor 29 is utilized to electrically isolate the high-low regulator 8 from the voltage sensor 7 thereby isolating the arc welding power supply 4 from the high-low regulator 8. The relatively slow response speed of the phototransistor 29 eliminates undesirable spurious electrical interference from being picked up by the high-low regulator 8. Capacitor 38 and phototransistor 29 function to create a representative voltage signal from the variable voltage signal which is sensed at the arc gap 3 by the voltage sensor 7 and which is transferred to the phototransistor 29 from the LED 23. The phototransistor 29 is powered by a voltage supply 31.

The representative voltage signal from the phototransistor 29 is summed at the inverting inputs of the op amps 30 and 32 with an adjusted reference voltage from voltage supply 33. The reference voltage supplied to op amp 30 is adjusted by variable resistance device 34 and the reference voltage supplied to op am 32 is adjusted by variable resistance device 35. These reference voltage signals are adjusted to cancel particular representative voltage signals from the phototransistor 29 which are generated when particular preselected voltages are sensed at the arc gap 3. The selected voltages are a high voltage and a low voltage corresponding to a high power flow level to the work pieces 1 and a low power flow level to the work pieces 1, respectively. The high power flow level is a power flow level above the optimal time-averaged power flow level and the low power flow level is a power flow level below this optimal level. The high and low power flow levels are limits beyond which it is undesirable to have the time-averaged power flow deviate if optimal welding is to be achieved. The high and low voltages may be selected to equal each other if no deviation from optimal time-averaged power flow is to be tolerated. However, usually some deviation is allowed to prevent the high-low regulator 8 from constantly modulating the duty cycle of the current pulses supplied across the arc gap 3 to the work pieces 1.

For example, if a representative voltage signal from phototransistor 29 to the inverting input of op amp 30 of minus 2.5 volts occurs at the selected high voltage signal corresponding to a high power flow level which it is desired not to exceed, then variable resistance device 34 is set so that a plus 2.5 volts is supplied from the voltage supply 33 to this inverting input of op amp 30. A positive output voltage signal, which is allowed to pass to the duty cycle generator 9 by diode 49, appears from the op amp 30 only when the phototransistor 29 provides a representative voltage signal to the inverting input of op amp 30 of less than minus 2.5 volts. The amount by which this representative voltage signal is less than the minus 2.5 volts corresponds to the amount by which the duty cycle of the current pulses at the arc gap 3 must be decreased to maintain the optimal time-averaged power flow to the work pieces 1. Alternatively, if a minus 1.5 volts representative signal occurs at the selected low voltage signal corresponding to a low power flow level which it is desired not to fall below, then variable resistance device 35 is set so that a plus 1.5 volts is supplied from the voltage supply 33 to the inverting input of op amp 32. A negative output voltage signal, which is allowed to pass to the duty cycle generator 9 by diode 53, appears from the op amp 32 only when the phototransistor 29 provides a representative voltage signal to the inverting input of op amp 32 of greater than minus 1.5 volts. The amount by which this representative voltage signal is greater than the minus 1.5 volts corresponds to the amount by which the duty cycle of the current pulses at the arc gap 3 must be increased to maintain the optimal time-averaged power flow to the work pieces 1.

Thus, the op amps 30, 32 and diodes 49, 53 operate to provide an output voltage signal only when the voltage sensed at the arc gap 7 and transmitted to the phototransistor 29 exceeds certain limits which are set by the variable resistance devices 34 and 35. If the variation in the voltage at the arc gap 3 does not exceed one of these preset limits than no voltage signal is outputted from the op amps 30 and 32 to point 56. However, if the voltage sensed should exceed either of the preselected limits then a voltage proportional to the amount by which the voltage exceeds the limit is outputted from either op amp 30 or op amp 32. The magnitude of this output voltage signal is adjusted by the resistance devices 50, 52 for the op amp 30 and by the resistance devices 54, 55 for the op amp 32. This adjusted voltage signal is supplied to the inverting input of the op amp 59. The voltage divider provides a continuous signal to the inverting input of op amp 59. Thus, if no voltage signal is supplied from op amps 30 and 32 to the op amp 59 the op amp 59 will still have an output corresponding to the signal supplied at its inverting input from the voltage divider. If there is a signal present at the point 56, this signal is summed with the signal from the voltage divider to provide an altered signal at the inverting input of op amp 59. The voltage signal at point 56 varies depending on the voltage sensed at the arc gap 3 by the voltage sensor 7. The signal from op amp 59 is transmitted through the lead 69 to the impulsar 10 of the arc welding system.

Time delay switches 45, 47 and 63 are used to prevent the feedback control circuit 2 from improperly operating during the start-up period for the arc welding system. Initially, switches 45 and 47 are closed and switch 63 is open, as shown in FIG. 3. When switches 45 and 47 are closed op amps 30 and 32, respectively, are shunted and thereby prevented from operating. If the op amp 30 was allowed to operate when the arc starter 5 is ionizing the inert gas at the arc gap 3 and initiating current flow across the arc gap 3, then it would defeat the operation of the arc starter 5. After the arc starter 5 has completed its function and after a first preselected time delay the normally open switch 63 closes and the normally closed switch 47 opens. During this first preselected time delay the current pulses supplied at the arc gap 3 have a larger duty cycle (pulse width) than desired for steady-state operation of the welding system. This larger duty cycle, during this first time delay, insures that proper heat transfer, fusion, and penetration is occurring at the work pieces 1 during the start-up period. When normally open switch 63 closes the variable resistance device 58 is shunted thereby lowering the voltage signal which is provided to op amp 59 from the voltage divider circuit. This alters the voltage control signal outputted from op amp 59 to step-down the duty cycle of the current pulses supplied to the arc gap 3. The duty cycle of the current pulses is decreased to the duty cycle desired for steady-state operation, that is, to that duty cycle which has previously been determined to result in optimal power flow to the work pieces 1. Normally closed switch 47 opens at the same time that normally open switch 63 closes thereby enabling op amp 32 to provide low limit regulation of the current pulses. Thus, if the voltage drop across the arc gap 3 is not sufficient to achieve optimal power flow at the decreased duty cycle then the op amp 32 operates to increase the duty cycle of the current pulses to compensate for this deficiency.

After a second preselected time delay, after step-down, the switch 45 opens to enable op amp 30 to provide high limit regulation of the current pulses. Op amp 30 is not enabled until after step-down to prevent the op amp 30 from interfering with arc stabilization during the start-up period. The opening of switch 45 ends the start-up period. Also, this allows the high-low regulator 8, through the operation of op amps 30 and 32, to modulate the duty cycle control signal outputted by op amp 59 of the duty cycle signal generator 9, as described previously.

The impulsar 10 of a conventional arc welding system commonly includes a circuit having a comparator for generating a control signal for the current regulator 11. Thus, the level of the voltage signal supplied by the duty cycle signal generator 9 to the impulsar 10 determines the duty cycle of the current pulses supplied by the power supply 4 to the arc gap 3. As the magnitude of the voltage signal from the op amp 59 of the duty cycle generator 9 increases the duty cycle of the pulses supplied at the arc gap 3 increases.

This is accomplished by supplying the voltage signal from the duty cycle signal generator 9 to the comparator of the impulsar 10 and then properly processing the output voltage signal from this comparator. An example of the operation of such a comparator is explained in the following discussion of FIGS. 6 and 7. It should be noted that there are many techniques of utilizing the voltage signal supplied from the duty cycle signal generator 9 to adjust the pulse width of the current pulses supplied at the arc gap 3. Also, it should be noted that the selected technique depends on the construction of the particular impulsar 10 which is being used. The foregoing is only one such technique for an impulsar which includes a particular comparator circuit.

Figure 4:
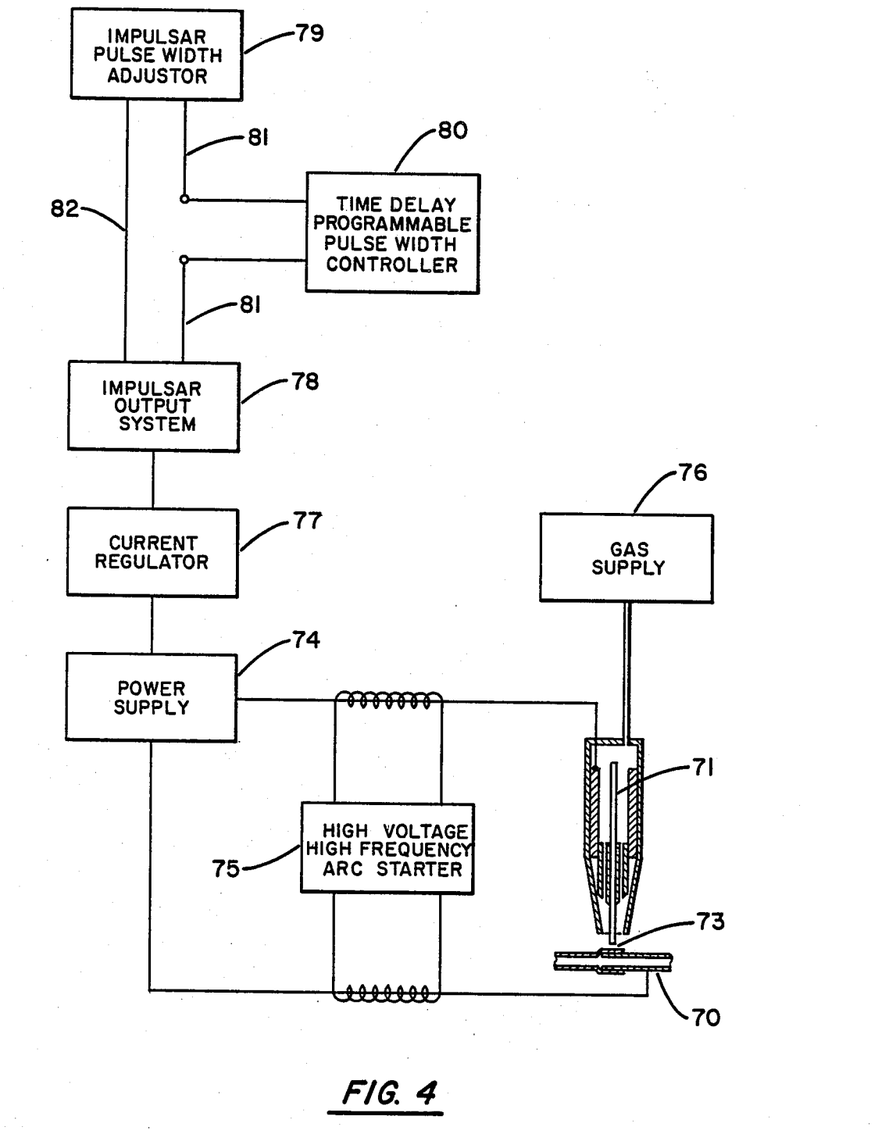
FIG. 4 shows a block diagram of an arc welding system including a controller for automatically adjusting the pulse width of current pulses supplied by a power supply to an arc gap.

Referring now to FIG. 4, a block diagram is shown for an arc welding system having a time delay programmable pulse width controller 80 used as part of the control system for the power supply of the arc welding system. As shown in FIG. 4, work pieces 70 and an electrode 71 form an arc gap 73 across while a voltage is supplied by power supply 74. High frequency high voltage arc starter 75 is also connected across the arc gap 73 to provide an initial high voltage for ionizing the inert gas supplied at the arc gap 73 from the gas supply means 76 at the beginning of a welding cycle and for initiating current flow across the arc gap 73. After this initial ionization and after the initial current flow begins the arc starter 75 discontinues operation. The power supply 74 is a commercially available pulsed positive DC power supply. A conventional current regulator 77 controlled by a conventional impulsar is used to control the operation of the power supply 74.

Figure 6:
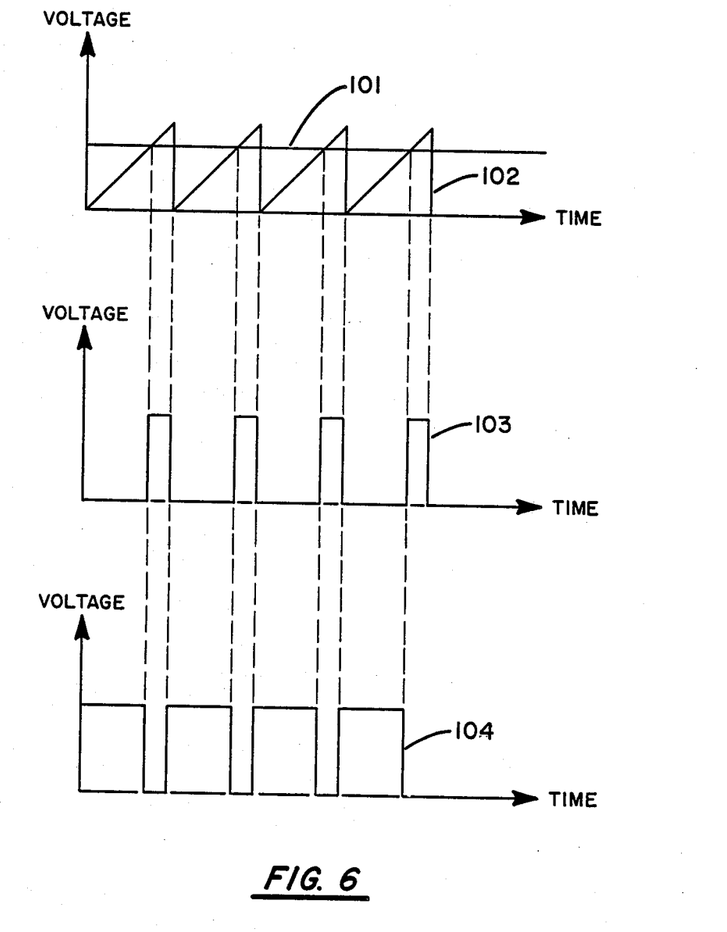
FIGS. 6 and 7 show how the impulsar output system shown in FIG. 5 operates to generate output voltage control signals of two different duty cycles in response to input voltage control signals of two different magnitudes when the impulsar output system includes a comparator.
Figure 7:
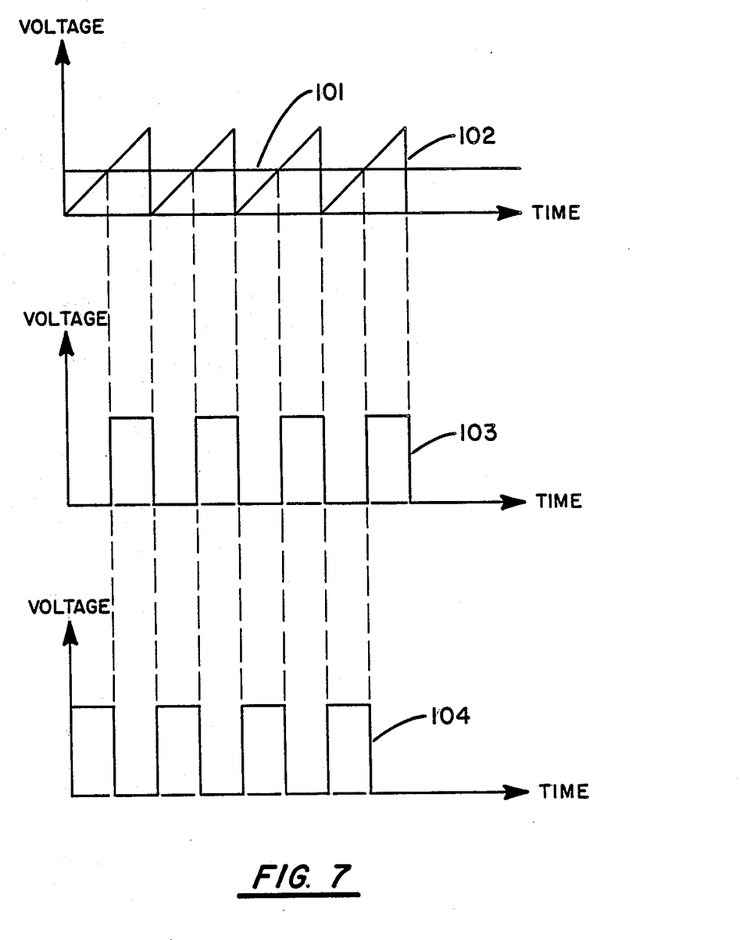

As shown in FIG. 4, the impulsar is depicted as divided into two parts. One part is designated as impulsar pulse width adjustor 79 and the other is designated an impulsar output system 78. The impulsar pulse width adjustor 79 is that part of the conventional impulsar which generates internal control signals for the impulsar, typically voltage signals, for controlling operation of electrical devices of the impulsar. Typically, the magnitude of an internal voltage control signal 101 supplied through an electrical lead 81 from the pulse width adjustor 79 to the impulsar output system 78 determines what pulse width control signal 104 will be outputted from the impulsar, as depicted in FIGS. 6 and 7. Other internal control signals may flow from the impulsar pulse width adjustor 79 to the impulsar output system 78 via electrical connector 82.

The impulsar output system 78 is that part of the conventional impulsar which generates an output control signal 104 for the current regulator 77 in response to the internal voltage control signal 101 from the impulsar pulse width adjustor 79. Typically, the impulsar output system 78 includes a comparator which compares a reference voltage signal 102, such as a voltage ramp function, to the internal voltage control signal 101 from the pulse width adjustor 79. FIGS. 6 and 7 depict how the comparator operates to generate output voltage signals 103 of different pulse widths in response to internal voltage control signals 101 of different magnitudes. Basically, the comparator generates an output voltage signal 103 only when the reference voltage signal 102 equals or exceeds the internal voltage control signal 101. Thus, the internal voltage control signal 101 shown in FIG. 6 results in a smaller pulse width for the comparator output voltage signal 103 compared to when the reduced internal voltage control signal 101 shown in FIG. 7 is utilized. Other conventional circuit elements of the impulsar output system 78 respond to the comparator output voltage signal 103 to generate an impulsar output control signal 104 for the current regulator 77. This output control signal 104 is keyed to the off-times of the comparator output voltage signal 103 so that the duty cycle of the current pulses supplied by the power supply 74 to the arc gap 73 is keyed to the off-times of the comparator output voltage signal 103. Thus, an increase in the internal voltage control signal, 101, which causes a decrease in the pulse width of the comparator output voltage signal 103, results in a corresponding increase in the duty cycle of the current pulses supplied at the arc gap 73.

The impulsar pulse width adjustor 79 of the arc welding system directly controls the operation of the impulsar output system 78. However, according to the principles of the present invention, a time delay programmable pulse width controller 80 is interposed between the conventional pulse width adjustor 79 of the impulsar and the impulsar output system 78. This programmable pulse width controller 80 operates to automatically adjust the impulsar output system 78 to control the current regulator 77, and thus power supply 74, to provide current pulses of varying pulse width according to a predetermined programmed sequence.

Figure 5:
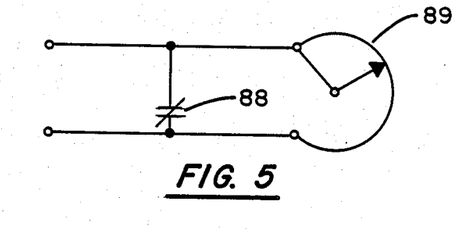
FIG. 5 shows specific circuit components for the automatic controller shown in FIG. 4.

The programmable pulse width controller 80 can be of a variety of constructions. The controller 80 can be most simply constructed by providing a variable resistance device 89 and a time delay switch 88 connected in parallel to each other and in series between the pulse width adjustor 79 and the impulsar output system 78. Such a controller 80 is shown in FIG. 5. It should be noted that the circuit shown in FIG. 5 is a simple example of a programmable pulse width controller 80. Other circuits could be devised by one of ordinary skill in the art to provide other more complex current programs.

In operation, positive DC pulses are supplied at the arc gap 73 by the power supply 74 as controlled by the current regulator 77 in response to the input from the impulsar output system 78. Initially a signal is supplied through the normally closed contacts of the time delay switch 88. However, time delay switch 88 operates after a preselected time delay to open the normally closed contacts. This interposes the variable resistance device 89 between the impulsar pulse width adjustor 79 and the impulsar output system 78. This results in a different signal being provided to the current regulator 77 and in turn to the power supply 74. This different signal adjusts the duty cycle of the pulses supplied at the arc gap 73. Typically, the duty cycle of the current pulses is decreased after the time delay. Normally, a decrease is required since there is a heat build-up at the work pieces 70 during the start-up period of operation of the arc welding system. Thus, it is necessary to reduce the power flow to the work pieces 70 after a period of time to maintain the optimal power flow which will consistently achieve good quality welds. The particular time delay and amount of reduction in duty cycle to achieve optimal welding depends on the particular work pieces 70 being welded. These parameters are best selected through a trial and error process.

Finally, it should be noted that, although the pulse width modulation of DC pulses according to the principles of the present invention is particularly suited for welding materials, such as aluminum, when using the special novel type of current pulse described previously, the present invention is not limited to use with this type of pulse. Pulse width modulation according to the principles of the present invention provides precise control of power flow to work pieces at an arc gap when arc welding practically any kind of material with DC pulses. For example, conventional DC pulses used in welding together stainless steel work pieces, especially thin wall pieces of stainless steel, can be modulated according to the principles of the present invention to provide precise control of the power flow to the work pieces to make high quality welds. Therefore, while the present invention has been described in connection with particular embodiments, it is to be understood that various other embodiments and modifications may be made without departing from the scope of the invention heretofore described and claimed in the appended claims.

What is claimed is:

1. Control device for a pulsed direct current (DC) arc welding system for arc welding work pieces comprising:
   a welding electrode for supplying electrical power to the work pieces at an arc gap;
   a power supply means for supplying a voltage to the welding electrode to generate a periodic series of direct current pulses which are applied across the arc gap to weld the work pieces;
   a monitoring means for sensing the resistance across the arc gap as the work pieces are welded; and
   pulse width adjustment means for modulating the duration of the current pulses in response to the resistance sensed at the arc gap, while maintaining the peak magnitude of the current pulses constant, to provide a constant time averaged power flow to the work pieces.

2. The control device as recited in claim 1 wherein the monitoring means comprises:
   a variable resistance device electrically connected in series between the work pieces and the electrode to form a first electrical circuit; and
   a light emitting diode electrically connected in parallel to the variable resistance device and in series between the electrode and the work pieces to form a second electrical circuit whereby said diode emits light which varies in intensity in direct proportion to the resistance across the arc gap and whereby said diode emits light having a background intensity which is determined by the resistance setting of the variable resistance device and the magnitude of the voltage supplied to the welding electrode.

3. The control device as recited in claims 1 or 2 wherein the pulse width adjustment means comprises:
   a high-low regulator means for responding to the resistance sensed by the monitoring means to provide a first output signal only when the sensed resistance at the arc gap exceeds a high limit and to provide a different second output signal when the sensed resistance at the arc gap is below a low limit; and
   a duty cycle control means for decreasing the duty cycle of the current pulses generated by the power supply means when the high-low regulator means provides the first output signal indicating that the resistance at the arc gap is above the high limit and for increasing the duty cycle of the current pulses generated by the power supply means when the high-low regulator means provides the second output signal indicating that the resistance at the arc gap is below the low limit whereby the current pulses applied across the arc gap have a constant peak current value and are varied in pulse width to provide a constant time-averaged power flow to the work pieces.

4. The control device as recited in claim 3 wherein the high-low regulator means comprises:
   a first operational amplifier means for providing a positive output voltage signal to the duty cycle control means when the monitoring means senses a resistance across the arc gap above the high limit;
   a second operational amplifier means for providing a negative output voltage signal to the duty cycle control means when the monitoring means senses a resistance across the arc gap which is below the low limit;
   a reference power supply means for supplying summing voltages to the inputs of the first and second operational amplifier means; and
   means for generating a voltage proportional to the value of the resistance sensed at the arc gap by the monitoring means, and for summing said generated voltage with the summing voltages of the reference power supply means at the inputs of the operational amplifier means to produce an effective input signal for the first operational amplifier means only when the sensed resistance exceeds the high limit and to produce an effective input signal for the second operational amplifier means only when the sensed resistance is less than the low limit.

5. The control device as recited in claim 3 wherein the duty cycle control means comprises:
   a reference means for continuously providing a selected reference output signal; and
   a summing means for generating an output signal in response to the sum of the reference output signal and the output signal from the high-low regulator means, said summing means output signal controlling the power supply means to supply current pulses to the arc gap, which have a reference pulse width determined by the reference signal from the reference means and which are modulated in pulse width in response to the output signal from the high-low regulator means.

6. The control device as recited in claim 5 wherein the reference means comprises a voltage divider including first and second variable resistance device means which are electrically connected in series between a voltage supply and ground; and
   wherein the summing means comprises an operational amplifier having its inverting input electrically connected to the voltage divider at a point between the first and second variable resistance devices and to the output of the high-low regulator means, said operational amplifier generating an output voltage signal which is used to control the power supply means in response to the summed input voltages from the voltage divider and the high-low regulator means.

* * * * *